United States Patent [19]

Clarey et al.

[11] Patent Number: 6,050,509

[45] Date of Patent: Apr. 18, 2000

[54] METHOD OF MANUFACTURING POLYMER-GRADE CLAY FOR USE IN NANOCOMPOSITES

[75] Inventors: Mark Clarey, Tupelo; James Edwards, Aberdeen, both of Miss.; Semeon J. Tsipursky, Lincolnwood, Ill.; Gary W. Beall, Mchenry, Ill.; Don D. Eisenhour, Grayslake, Ill.

[73] Assignee: AMCOL International Corporation, Arlington Heights, Ill.

[21] Appl. No.: 09/040,639

[22] Filed: Mar. 18, 1998

[51] Int. Cl.[7] ................................................. B02C 23/08
[52] U.S. Cl. ................ 241/21; 241/24.11; 241/24.23; 241/27
[58] Field of Search .............................. 241/15, 21, 24.1, 241/24.11, 24.12, 24.23, 27, 29

[56] References Cited

U.S. PATENT DOCUMENTS

| 2,035,546 | 3/1936 | Hamilton | 167/24 |
|---|---|---|---|
| 3,252,757 | 5/1966 | Granquist | 23/111 |
| 3,419,460 | 12/1968 | Ure | 161/162 |
| 3,419,517 | 12/1968 | Hedrick et al. | 260/37 |
| 3,515,626 | 6/1970 | Duffield | 161/162 |
| 3,572,500 | 3/1971 | Kouloheris | 241/16 X |
| 3,599,879 | 8/1971 | Clark | 241/4 |
| 3,773,708 | 11/1973 | Takahashi et al. | 260/41 R |
| 3,795,650 | 3/1974 | Burns | 260/33.4 R |
| 3,844,978 | 10/1974 | Hickson | 252/455 R |

(List continued on next page.)

FOREIGN PATENT DOCUMENTS

| 0 205 281 A3 | 12/1986 | European Pat. Off. . |
|---|---|---|
| 0 335 653 A1 | 10/1989 | European Pat. Off. . |
| 0 358 415 A1 | 3/1990 | European Pat. Off. . |
| 0 479 031 A1 | 4/1992 | European Pat. Off. . |
| 0 548 940 A1 | 6/1993 | European Pat. Off. . |
| 0 645 181 A2 | 3/1995 | European Pat. Off. . |
| 0 761 739 A1 | 3/1997 | European Pat. Off. . |
| 2 526 779 | 11/1983 | France . |
| 1 642 122 | 7/1970 | Germany . |
| 1 146 668 | 3/1969 | United Kingdom . |
| 1 565 362 | 4/1980 | United Kingdom . |
| WO 93/04117 | 3/1993 | WIPO . |
| WO 93/04118 | 3/1993 | WIPO . |
| WO 93/11190 | 6/1993 | WIPO . |
| WO 96 37286 | 11/1996 | WIPO . |

OTHER PUBLICATIONS

C. W. Francis, "Adsorption of Polyvinylpyrrolidone on reference Clay Minerals", Soil Science, vol. 115, No. 1, 1973, pp. 40–54.

(List continued on next page.)

*Primary Examiner*—John M. Husar
*Attorney, Agent, or Firm*—Marshall, O'Toole, Gerstein, Murray & Borun

[57] ABSTRACT

A clay purification process, for removing impurities recovered with the clay, particularly a montmorillonite clay, includes the steps of separating the clay from rocks and other large non-clay impurities; dispersing the clay and smaller impurities in water, preferably at a concentration of at least about 4% by weight clay, based on the total weight of clay and water, more preferably about 6–10% by weight clay in water, to provide a clay slurry; passing the clay slurry through a series of hydrocyclones to remove the larger particles (impurities) while retaining clay particles having a size of about 100 microns or less, particularly about 80 microns or less; ion exchanging the clay to remove at least about 95% of the interlayer, multivalent (e.g., divalent and trivalent) cations in an ion exchange column, wherein the multivalent ions are replaced by monovalent cations, such as sodium, lithium and/or hydrogen; and then centrifuging the clay to remove a majority of the particles having a size in the range of about 0.5 $\mu$m to about 100 $\mu$m.

44 Claims, 16 Drawing Sheets

U.S. PATENT DOCUMENTS

| | | | |
|---|---|---|---|
| 3,855,147 | 12/1974 | Granquist | 252/317 |
| 3,879,283 | 4/1975 | Mercade | 205/5 |
| 3,892,655 | 7/1975 | Hickson | 208/111 |
| 3,912,532 | 10/1975 | Simone | 106/308 N |
| 3,929,678 | 12/1975 | Laughlin et al. | 252/526 |
| 4,018,673 | 4/1977 | Hughes et al. | 241/16 X |
| 4,054,537 | 10/1977 | Wright et al. | 252/317 |
| 4,125,411 | 11/1978 | Lyons | 106/291 |
| 4,210,572 | 7/1980 | Herman et al. | 260/404 |
| 4,251,576 | 2/1981 | Osborn et al. | 428/331 |
| 4,315,879 | 2/1982 | Pfuhl et al. | 241/23 X |
| 4,400,485 | 8/1983 | Mukamal et al. | 524/444 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,613,542 | 9/1986 | Alexander | 428/290 |
| 4,624,982 | 11/1986 | Alexander | 524/446 |
| 4,739,007 | 4/1988 | Okada et al. | 524/789 |
| 4,749,676 | 6/1988 | Blumenthal et al. | 502/251 |
| 4,789,403 | 12/1988 | Rice | 106/417 |
| 4,798,766 | 1/1989 | Rice | 428/404 |
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,875,762 | 10/1989 | Kato et al. | 350/357 |
| 4,889,885 | 12/1989 | Usuki et al. | 524/445 |
| 4,894,411 | 1/1990 | Okada et al. | 524/710 |
| 4,920,171 | 4/1990 | Hutton, Jr. et al. | 524/446 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,393,340 | 2/1995 | Slepetys et al. | 241/20 X |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,522,924 | 6/1996 | Smith et al. | 241/24.23 X |
| 5,552,469 | 9/1996 | Beall et al. | 524/445 |
| 5,578,672 | 11/1996 | Beall et al. | 624/446 |
| 5,624,488 | 4/1997 | Forbus et al. | 241/24.1 X |
| 5,667,886 | 9/1997 | Gough et al. | 428/331 |
| 5,698,624 | 12/1997 | Beall et al. | 524/445 |
| 5,760,106 | 6/1998 | Pinnavaia et al. | 523/209 |

OTHER PUBLICATIONS

A. Usuki, et al., "Synthesis of nylon 6–clay hybrid", J. Mater. Res., vol. 8, No. 5, May 1993, pp. 1179–1184.

Y. Kojima, et al., "Mechanical Properties Of Nylon 6–Clay Hybrid", J. Mater. Res., vol. 8, No. 5, May 1993, pp. 1185–1189.

K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties Of Nylon 6—Clay Hybrid", (source and date unknown), pp. 651–652.

G.W. Brindley, et al., "Preparation And Solvatio Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For ω–Amino Acids By ∈–Caprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al. "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1, (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", Clay Science, vol. 7, 1989,Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

Sanchez Camazano, M. et al., "Factors influencing interactions of organophosphorus pesticides with montmorillonite", *Chemical Abstracts*, vol. 98, No. 19, May 9,1983, Columbus, Ohio, US, Abstract No. 156367.

T. Lan, et al., "Clay–Epoxy Nanocomposites:Relationships Between Reinforcement Properties And The Extent Of Clay Layer Exfoliation", *Polym. Mater. Sc. Eng.*, 73, pp. 296–297 (1995).

Nakazawa, et al. "Montmorillonite Crystallization From Glass", *Clay Science 8*, pp. 59–68 (1991).

Tomita, et al., "Synthesis Of Smectite From Volcanic Glass At Low Temperature", *Clays and Clay Minerals*, vol. 41, No. 6, pp. 655–661 (1993).

Moore, et al. "X–Ray Diffraction and the Identification and Analysis of Clay Minerals", ©1989 by Oxford University Press, Inc., pp. 102–271.

Chemical abstract 128:63539, "Hydrothermal synthesis of novel smectite–like mesophorous materials", Torii et al., Journal of porous materials.

METHOD OF MANUFACTURING POLYMER-GRADE CLAY FOR USE IN NANOCOMPOSITES

FIELD OF THE INVENTION

The present invention is directed to a method for manufacturing polymer-grade clay for use in nanocomposites. More particularly, the present invention is directed to a method of purifying a clay deposit by a process for the removal of crystalline impurities, such as quartz, plagioclase, orthoclase, carbonates, sulphates, and the like, as well as amorphous impurities, such amorphous silica, such that the purified clay includes 5% by weight or less impurities, preferably 3% by weight or less, more preferably 2% by weight or less of impurities. In accordance with the present invention, after removal of larger impurities, such as by hydrocyclones, the clay is ion exchanged for removal of divalent and trivalent exchangeable cations within the interlayer spaces between the clay platelets and substituting monovalent cations such as sodium, lithium and/or hydrogen, prior to high-speed centrifuging to separate smaller impurities.

BACKGROUND OF THE INVENTION AND PRIOR ART

It is well known that layered materials, such as phyllosilicates, can be separated or exfoliated into their individual clay platelets, as disclosed in this assignee's U.S. Pat. Nos. 5,552,469; 5,578,672; and 5,698,624. The exfoliated platelets are useful as fillers for polymeric materials to achieve increases in strength, temperature resistance, gas impermeability, and other properties. While the technology has existed for many years for exfoliating clay platelets and combining such clay platelets with polymeric materials, this technology has not been commercialized, for one reason, among others, that while the addition of exfoliated clay platelets to the polymeric materials has substantially enhanced one or more properties of the polymer, the addition of clay impurities together with the exfoliated platelets has caused a marginal improvement, or has actually caused a decrease in properties that the platelets are designed to increase. Thus far, it has been impossible to sufficiently purify a layered material, such as a phyllosilicate, particularly a smectite clay, such that exfoliated platelets obtained from the purified clay are sufficiently free from clay impurities to significantly enhance the desired properties of the polymer.

The present invention includes a method for purifying such purifiable clays in order to manufacture polymer-grade, purified clay useful in nanocomposites.

SUMMARY OF THE INVENTION

In brief, the present invention is directed to a method of purifying clay deposits, particularly smectite clay deposits, such as montmorillonite clay, such that the purified clay has impurities in an amount of less than about 5% by weight, preferably less than about 2% by weight, more preferably less than about 1% by weight, based on the total weight of clay and impurities. Impurities, in accordance with a preferred embodiment of the present invention, are hereby defined as any material that is not a smectite clay. Further, the present invention is directed to a method of purifying such purifiable clay deposits for the manufacture of polymer-grade clays for use in nanocomposites.

The purification process generally includes the steps of separating the clay from rocks and other large non-clay impurities; dispersing the clay and smaller impurities in water, preferably at a concentration of at least about 4% by weight clay, based on the total weight of clay and water, more preferably about 6–10% by weight clay in water, to provide a clay slurry; passing the clay slurry through a series of hydrocyclones to remove the larger particles (impurities) while retaining clay particles having a size of about 100 microns or less, particularly about 80 microns or less; ion exchanging the clay to remove at least about 95% of the interlayer, multivalent (e.g., divalent and trivalent) cations in an ion exchange column, wherein the multivalent ions are replaced by monovalent cations, such as sodium, lithium and/or hydrogen; and then centrifuging the clay to remove a majority of the particles having a size in the range of about 5 $\mu$m to about 100 $\mu$m.

Accordingly, one aspect of the present invention is to provide a method of purifying a smectite clay-containing composition to remove sufficient non-smectite impurities such that the purified clay can be used as a filler in plastics and other materials to form nanocomposite compositions.

Another aspect of the present invention is to provide a method of purifying a clay composition by removing at least about 95% by volume of clay composition particles having a size greater than about 5 $\mu$m.

Another aspect of the present invention is to provide a method of purifying a clay composition containing non-clay impurities that includes the steps of removing larger impurity particles in one or more hydrocyclones to form a partially purified clay composition; ion-exchanging the partially purified clay in the partially purified clay composition to substitute monovalent cations for at least 90% by volume of the multivalent clay interlayer cations; and then centrifuging the ion-exchanged clay-containing composition to remove particles having a particle size of about 10 microns or larger.

The above and other aspects and advantages of the present invention will become more apparent from the following detailed description of the preferred embodiments taken in conjunction with the drawings.

DETAILED DESCRIPTION OF THE PREFERRED EMBODIMENTS

Figure 1A:
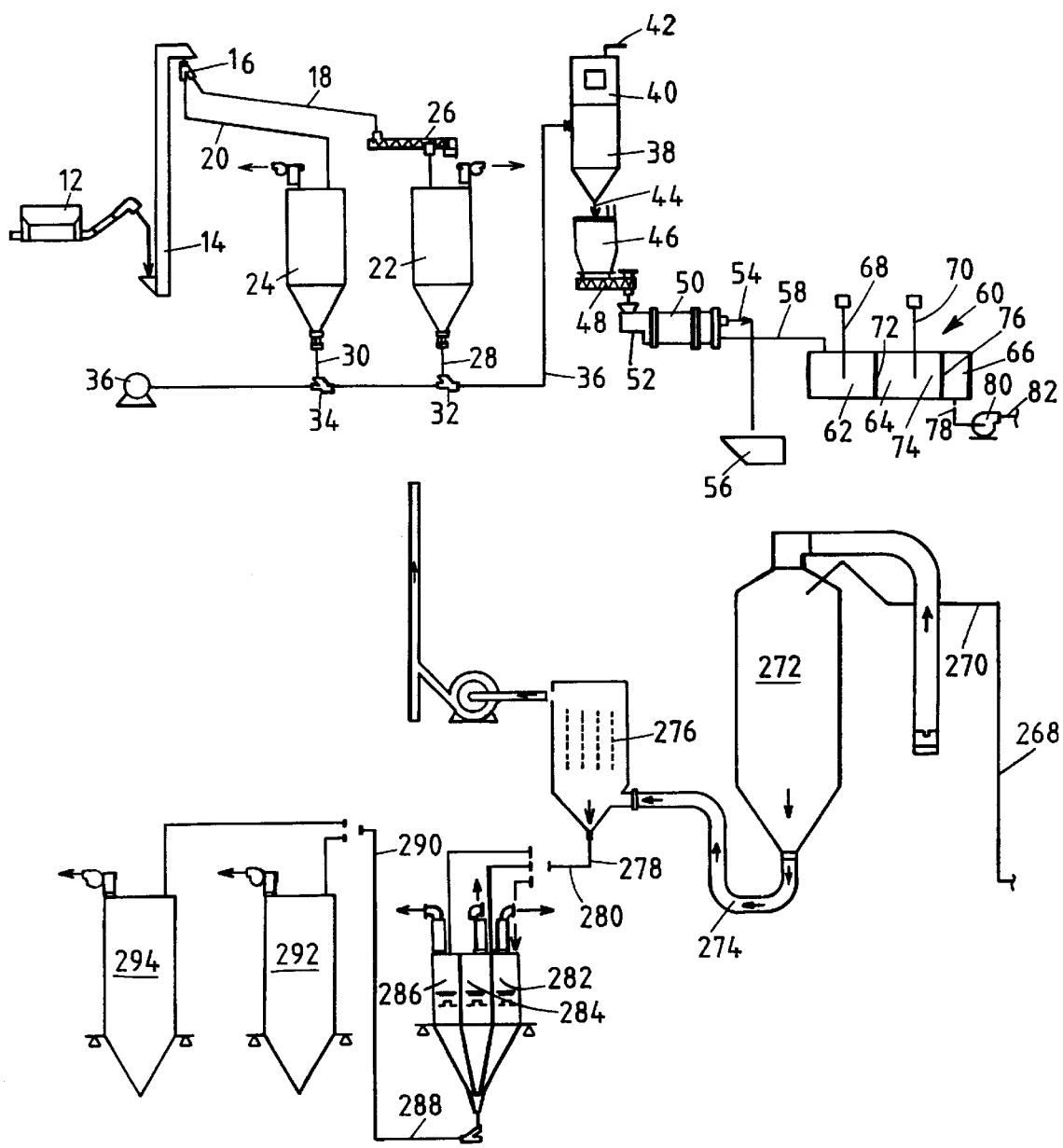
FIG. 1 is a schematic flow diagram of the purification process and apparatus of the present invention.

As set forth in more detail throughout this specification, polymer-grade clay should have less than about 5% by weight non-smectite impurities, preferably less than about 2% by weight non-smectite impurities, including crystalline and amorphous impurities, in order to provide new and unexpected results in enhancement of polymer properties, when combined with the polymer in a nanocomposite composition.

Typical crystalline impurities found in smectite clay deposits include quartz ($SiO_2$), feldspar ($KAlSi_3O_8$), opal-CT ($SiO_2$); gypsum ($CaSO_4 \cdot 2H_2O$); albite ($NaAlSi_3O_8$); anorthite ($CaAl_{12}Si_2O_8$); orthoclase ($KAlSi_3O_8$); apatite ($Ca_5 (PO_4)_3(F,Cl,OH)$); halite ($NaCl$); calcite ($CaCO_3$); dolomite ($CaMg(CO_3)_2$); sodium carbonate ($Na_2CO_3$); siderite ($FeCO_3$) biotite ($K(Mg,Fe)_3(AlSi_3O_{10}) (OH)_2$) muscovite ($KAl_2(AlSi_3O_{10}) (OH)_2$); chlorite (($Mg,Fe)_6(Si,Al)_4O_{10}$ $(OH)_8$); stilbite ($NaCa_2Al_5Si_{13}O_{36} \cdot 14H_2O$); pyrite ($FeS_2$); kaolinite ($Al_2Si_2O_5 \cdot (OH)_4$); and hematite ($Fe_2O_3$)

The clay is dispersed in water, preferably at a concentration of about 10% to about 15% by weight, based on the total weight of clay and water. Although any clay can be purified in accordance with the claimed method, the preferred clay is a smectite clay, such as a montmorillonite clay, that is predominantly (greater than about 50% by weight) calcium montmorillonite clay so that the concentration of clay dispersed in water can be as high as about 15% by weight. If, for example, a sodium montmorillonite clay is dispersed in water, the higher swelling capacity of sodium montmorillonite in water will result in a viscosity that is too high for handling at a concentration of about 6–10% by weight. Accordingly, in order to achieve the most efficient purification of clay, it is preferred that the clay dispersed in water is a montmorillonite clay having predominantly multivalent cations, i.e., $Ca^{+2}$ in the interlayer space, such as calcium montmorillonite clay. If the clay is not predominantly a multivalent clay, such as calcium montmorillonite, it can be ion-exchanged sufficiently to provide predominantly multivalent ions in the interlayer spaces between montmorillonite clay platelets.

The clay slurry is then directed into a series of cascaded hydrocyclones of decreasing size, each hydrocyclone capable of removing impurities of at least a particular size, particularly the impurities having a size greater than about 50 microns. The resulting clay, separated from the impurities, has a particle size such that at least about 90% by volume of the clay particles have a size below about 50 microns. The clay slurry is then directed upwardly through a cation exchange column that removes multivalent interlayer cations from the montmorillonite clay (e.g., divalent and/or trivalent cations) and substitutes monovalent cations such as sodium, lithium and/or hydrogen for the multivalent cations within the interlayer spaces between platelets of the montmorillonite clay.

After essentially complete ion exchange, such that the clay has at least 95% monovalent cations in the interlayer spaces, the clay is then directed into a high speed centrifuge where the clay is subjected to centrifugal force equal to, for example, at least about 2,000 G (forces of gravity) up to about 4,000 G, preferably about 2,500 G to about 3,500 G, capable of removing clay particle sizes between about 5 microns and about 50 microns, such that the remaining montmorillonite clay particles, having less than about 50 by weight crystalline and amorphous non-smectite clay impurities, preferably less than about 2% by weight impurities therein, have a particle size of about 10 microns or less, preferably about 8 microns or less, and have an average particle size less than about 3 microns, preferably less than about 2 microns.

DETAILED DESCRIPTION OF THE PREFERRED EMBODIMENTS

Figure 1B:
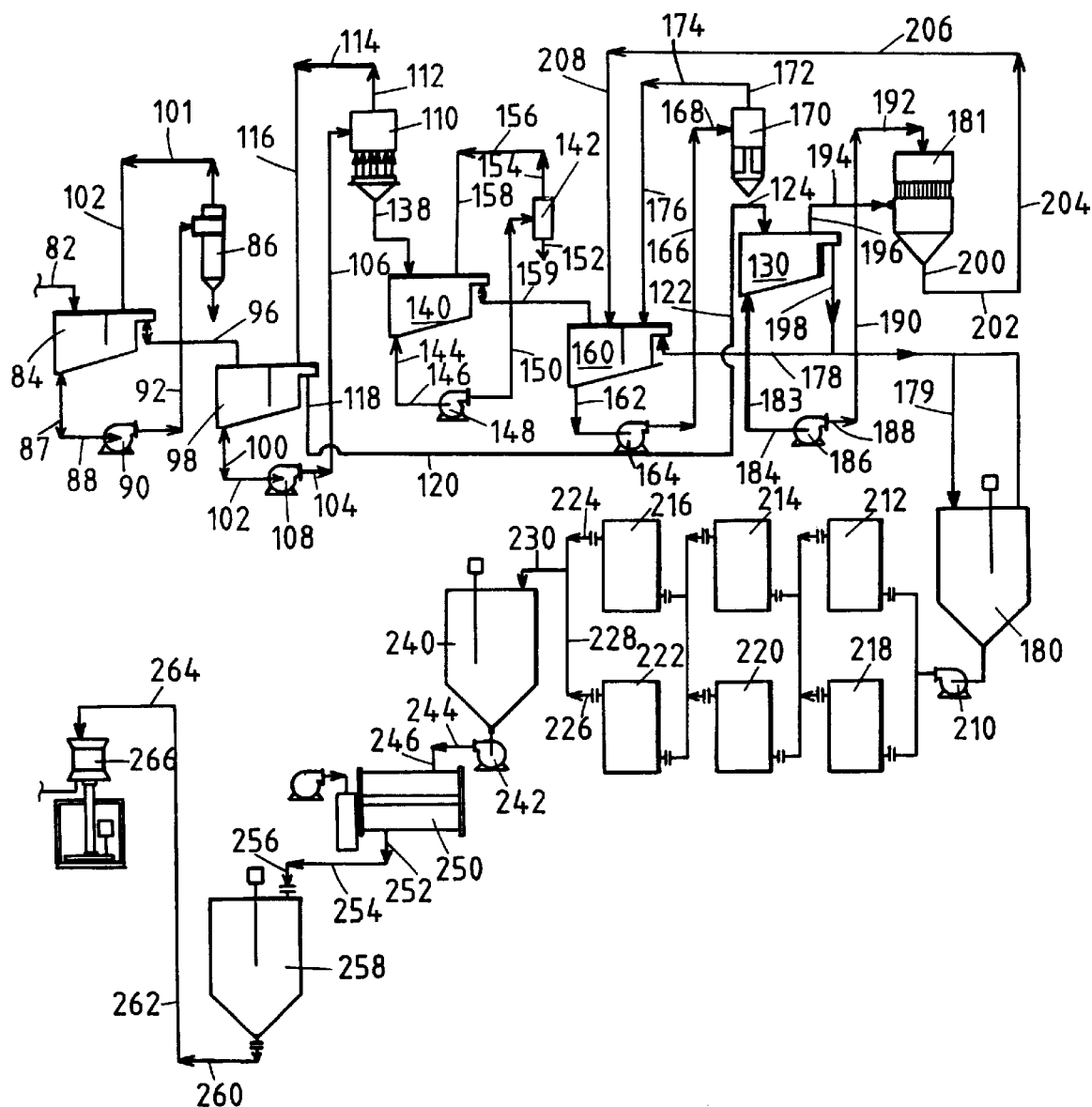

Turning now to the drawings, and initially to FIG. 1, there is shown a schematic flow diagram of a method and apparatus for purifying clay in accordance with the present invention. As shown in FIG. 1, raw, ground clay, including impurities, preferably ground to a particle size distribution such that at least about 90% by weight of the clay particles have a particle size less than about 200 microns and a mean particle size in the range of about 30 to about 50 microns, is fed from a crude clay unloader 12 into a crude clay elevator 14. The crude clay is conveyed by gravity to a crude clay diverter 16 and then through conduits 18 and 20 into a pair of crude clay storage tanks 22 and 24. A crude clay conveyor 26 is used to fill crude storage tank 22 because of the increased distance between the clay diverter 16 and crude storage tank 22.

Crude clay from storage tank 22 and/or 24 flows through outlet conduits 28 and/or 30 into air injectors 32 and 34. Crude clay blower 36 pumps air into injectors 32 and 34 where the air is mixed with the crude clay to propel the clay through conduit 36 into an upper portion of a crude clay receiving vessel 38. Crude clay receiving vessel 38 includes an integral baghouse 40 disposed on its upper end for filtering out and retaining finer clay particles while allowing the air that carries the finer clay particles into the receiving vessel 30 to exit the baghouse through conduit 42, while retaining clay particles within the crude clay receiving vessel 38.

Clay from crude clay receiving vessel 38 is fed by gravity from a bottom of the crude clay receiving vessel 38 through conduit 44 into a crude clay feeder 46. The crude clay from clay feeder 46 is conveyed through auger 48 into a blunger 50 where the crude clay is mixed with water from water supply conduit 52 to provide a clay/water/impurities mixture, or clay slurry, containing about 5% to about 50% clay and impurities mixed with about 50–95% by weight water, based on the total weight of the mixture. Blunger 50 is a device that separates the very large non-clay impurities, such as rocks and the like, from the clay, preferably without screening. Details for the blunger are set forth in this Assignee's U.S. patent application Ser. No. 08/920,989 filed Aug. 29, 1997, hereby incorporated by reference.

In the blunger 50, the clay slurry (clay/impurities/water mixture) is agitated to allow the larger, heavier impurities, such as rocks, to separate by gravity from the clay, lighter impurities, and water. Relatively large, heavy impurities, such as rocks, are removed from the blunger through conduit 54 and are collected in waste hopper 56. Clay and smaller impurities are removed from the blunger 50 through conduit 58 and conveyed by gravity to an attrition scrubber, generally designated by reference numeral 60, that includes three scrubbing sections 62, 64 and 66. The clay and smaller impurities are agitated with water in scrubber sections 62 and 64 with attrition scrubber agitators 68 and 70, respectively, where the clay and smaller impurities are washed with the water that was combined with the clay in the blunger 50.

Figure 2:
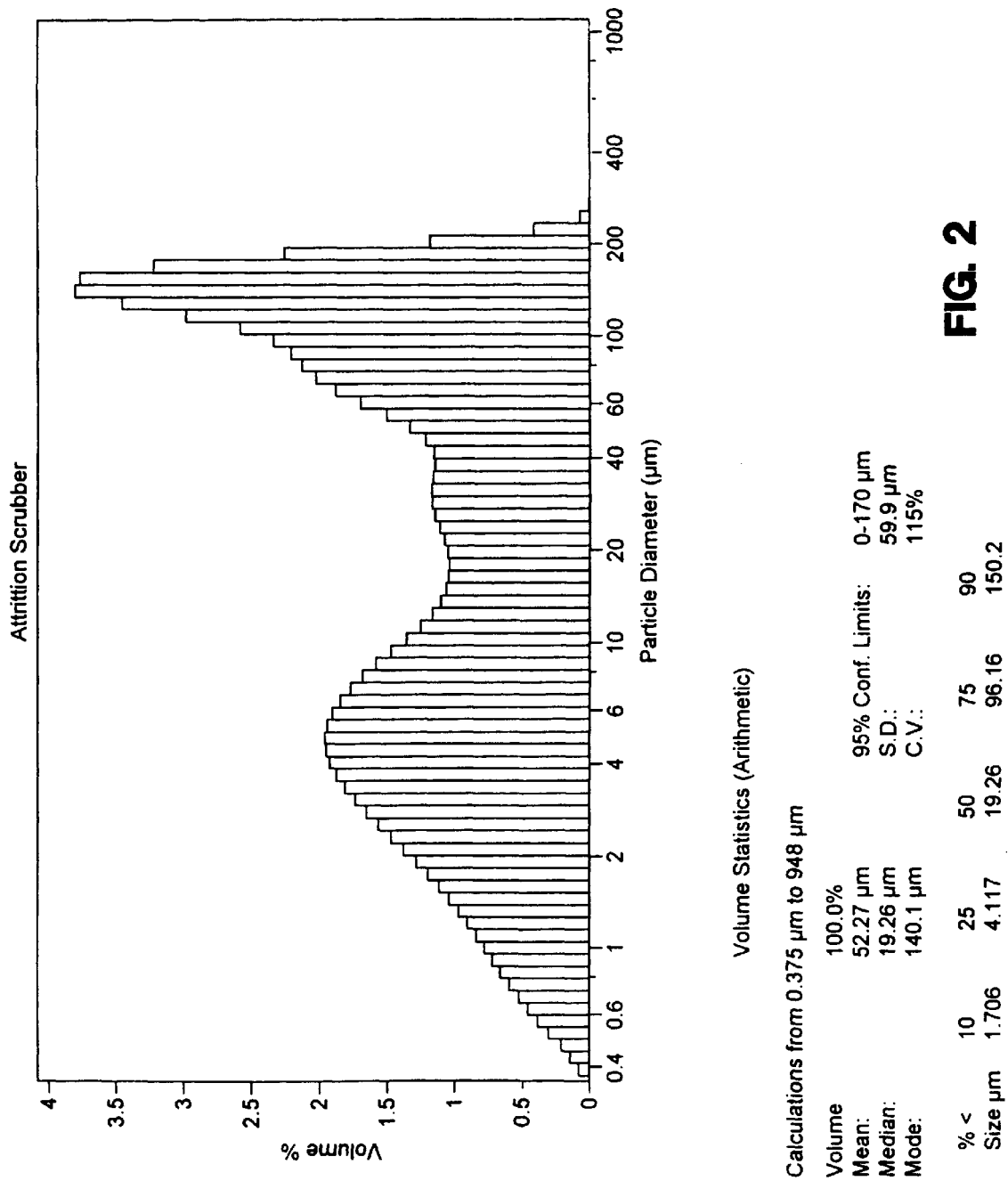
FIG. 2 is a graph showing particle size distribution for the clay and impurities fed to a first (six inch) hydrocyclone purification step of the purification process shown schematically in FIG. 1.

In attrition scrubber 60, the clay and impurities flow from scrubber section 62 under weir 72 into scrubber section 64 where settled impurities are removed through impurity drain conduit 74. The clay, smaller impurities and water then flow from attrition scrubber section 64 over weir 76 into attrition scrubber section 66. The washed clay is removed from attrition scrubber section 66 through conduit 78 and pumped by pump 80 through conduit 82 into a feed tank 84 for a six inch hydrocyclone 86. In a preferred embodiment, the particle size distribution of the clay in the slurry (clay/impurities/water mixture) existing in the attrition scrubber is shown in FIG. 2.

From the attrition scrubber 60, the washed clay is conveyed through a series of hydrocyclones that, in the preferred embodiment, remove at least about 90% by volume of the particles having a size greater than about 40 microns, leaving clay and impurities having a median particle size less than about 10 microns, and a mean particle size less than about 5 microns.

Figure 3:
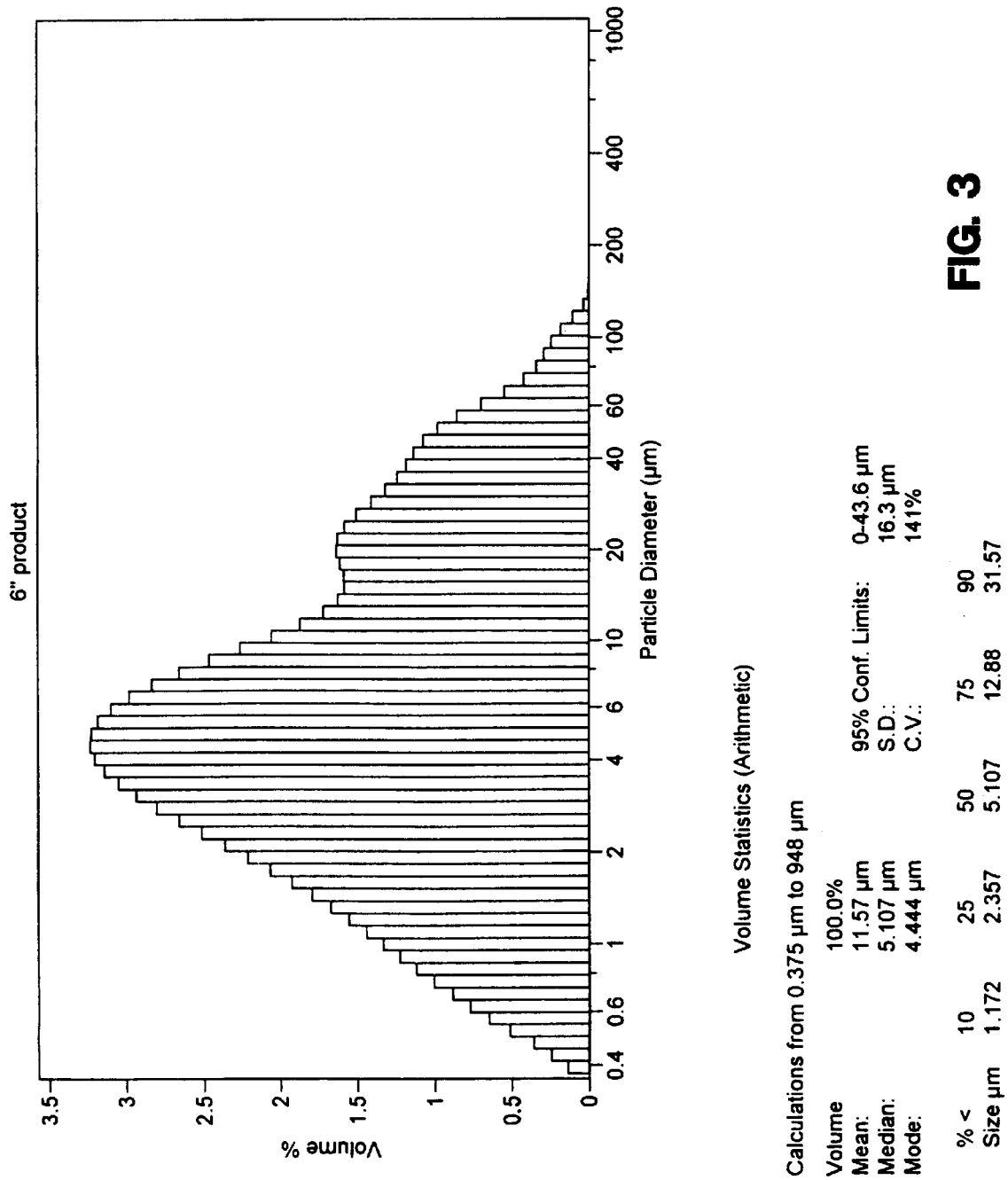
FIG. 3 is a graph showing particle size distribution for the clay and impurities after treatment in the first (six inch) hydrocyclone purification step of the purification process shown schematically in FIG. 1.
Figure 4:
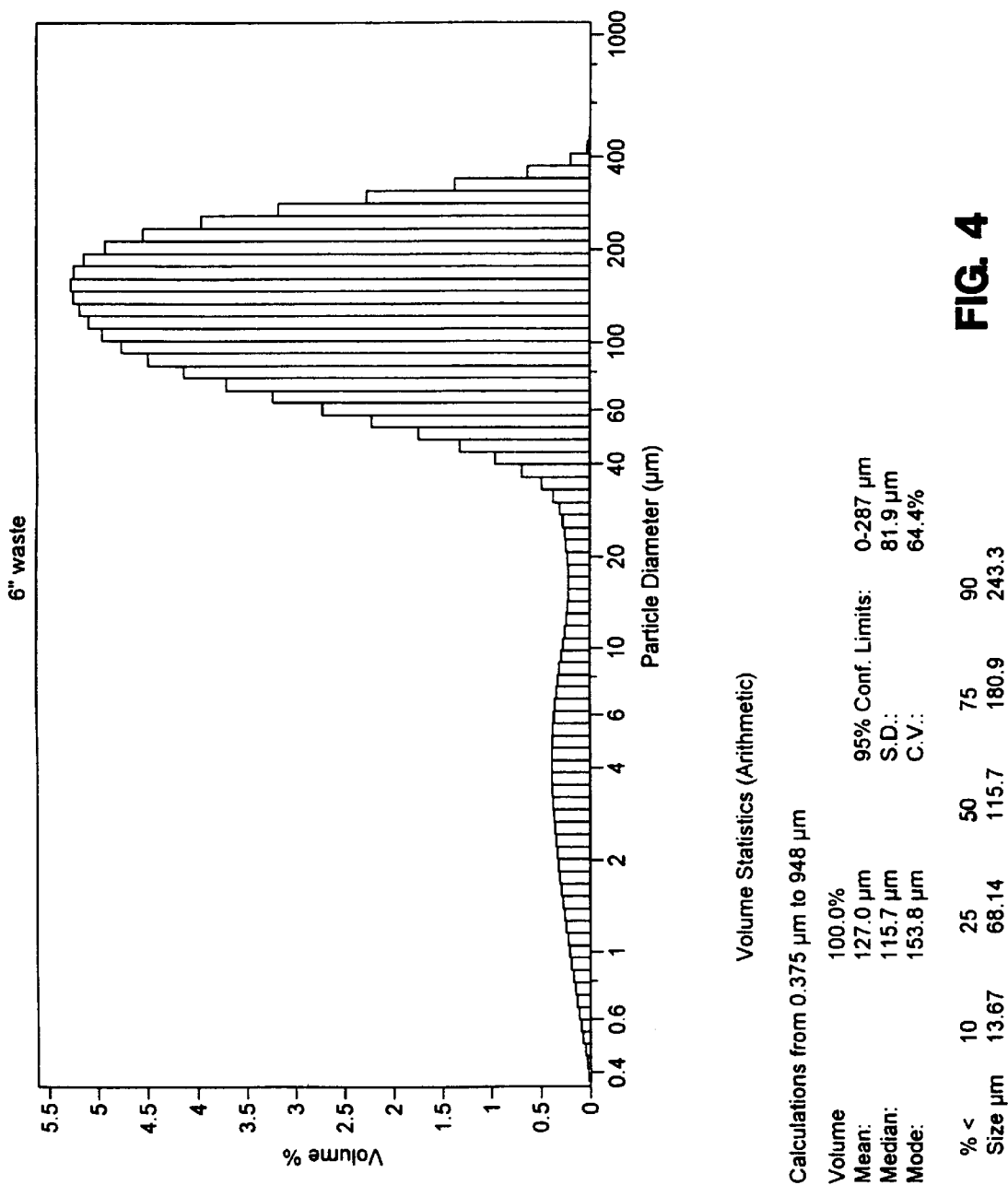
FIG. 4 is a graph showing particle size distribution for the clay and impurities removed from the product in the first (six inch) hydrocyclone purification step of the process shown schematically in FIG. 1.

In accordance with a preferred embodiment of the present invention, pump 80 pumps the clay slurry (clay/impurities/water mixture) at a rate of about 50 gallons per minute into the six inch hydrocyclone feed tank 84. The washed clay slurry is pumped from the bottom of the six inch hydrocyclone feed tank 84 through conduits 87 and 88, by a feed pump 90 for the six inch hydrocyclone 86, through conduit 92 into a side inlet for the six inch hydrocyclone 86 at a rate of about 100 gallons per minute. Overflow from the six inch hydrocyclone feed tank 84 flows through conduit 96 into a primary two inch hydrocyclone feed tank 98 at a rate of about 45 gallons per minute. The particle size distribution of the clay in the clay slurry conveyed from the 6 inch hydrocyclone 86 to the primary two inch hydrocyclone feed tank 98 is shown in FIG. 3. The particle size distribution of the clay removed from the slurry in the six inch hydrocyclone 86 is shown in FIG. 4.

The six inch hydrocyclone 86 is basically a gravity separator that removes at least about 90% by volume of the impurity particles having a size greater than about 100 microns, in the form of grit and relatively large impurities, together with a small portion of finer particles, including a small portion of the montmorillonite clay particles. These impurities (FIG. 4)—less than 10% by volume having a particle size less than about 5 microns are removed from a bottom of the six inch hydrocyclone 86 through conduit 99 and collected in a grit waste tank (not shown). The clay slurry (clay/impurities/water mixture), including impurities having a size such that at least about 90% by volume of the particles have a size less than about 100 microns (see FIG. 3), exit from the top of the six inch hydrocyclone 86 and are conveyed through conduits 100, 101 and 102 for recycling to the six inch hydrocyclone feed tank 84. Pump 90 that feeds the clay slurry from the six inch hydrocyclone feed tank 84 to the six inch hydrocyclone 86 pumps material at about 100 gallons per minute, in a preferred embodiment, so that the material entering the six inch hydrocyclone feed tank 84 at a rate of about 50 gallons per minute recirculates through the feed tank 84 and six inch hydrocyclone 86 at least about two times. Overflow from the six inch hydrocyclone 86 flows out of the six inch hydrocyclone feed tank 84 (see FIG. 3 for particle size distribution) through conduit 96 into a primary two inch hydrocyclone feed tank 98 at a rate of about 45 gallons per minute.

The clay slurry (FIG. 3) flows from the two inch hydrocyclone feed tank 98 through conduits 100, 102, 104, 106 and pump 108 to a primary two inch hydrocyclone 110. The feed to the primary two inch hydrocyclone 110 includes impurities smaller than about 150 microns, at least about 90% by volume being particles less than about 60 microns, and is fed to the primary two inch hydrocyclone 110 at a rate of about 100 gallons per minute. The primary two inch hydrocyclone 110 removes at least about 90% by volume of the impurities having a size greater than about 50 microns (compare FIGS. 3 and 5). The clay slurry is recirculated through conduits 112, 114 and 116 back to the primary two inch hydrocyclone feed tank 98 at a rate of about 100 gallons per minute to assure at least about two passes through the primary two inch hydrocyclone 110 for additional removal of the impurities having a size greater than about 50 microns, together with a small portion of the smaller particles.

Overflow or product (see FIG. 5 for particle size distribution) from the primary two inch hydrocyclone 110 flows out of an upper portion of the two inch hydrocyclone feed tank 98 along conduits 118, 120, 122, 124 and flows by gravity to a primary one inch hydrocyclone feed tank 130 at a rate of about 30 gallons per minute, including impurities having a size less than about 80 microns. At least about 90% by volume of the particles from the two inch hydrocyclone overflow have a particle size less than about 50 microns, a mean particle size less than about 10 microns, and a median particle size less than about 5 microns.

Figure 6:
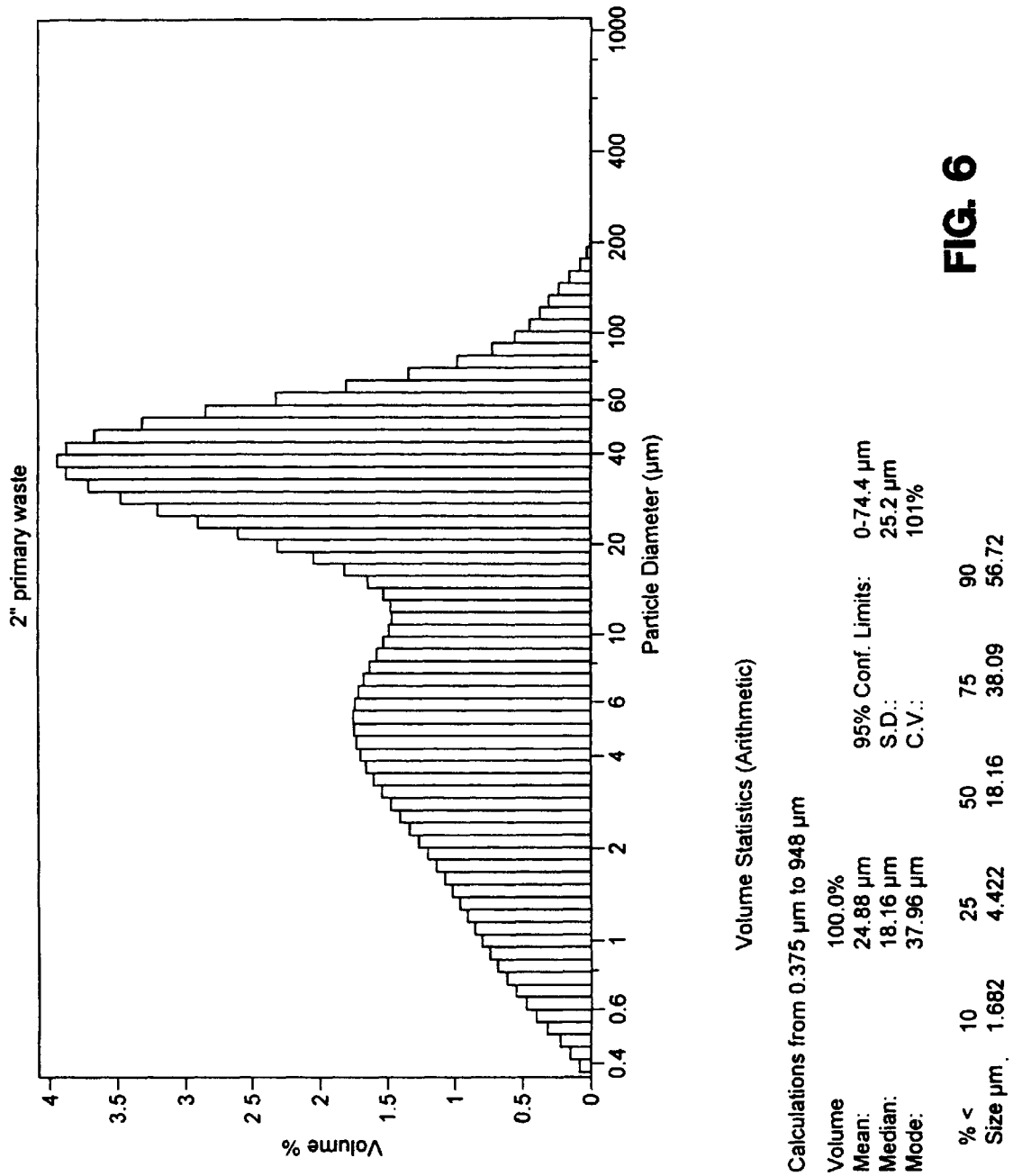
FIG. 6 is a graph showing particle size distribution for the clay and impurities removed from the product in the primary two inch hydrocyclone purification step of the purification process shown schematically in FIG. 1.
Figure 7:
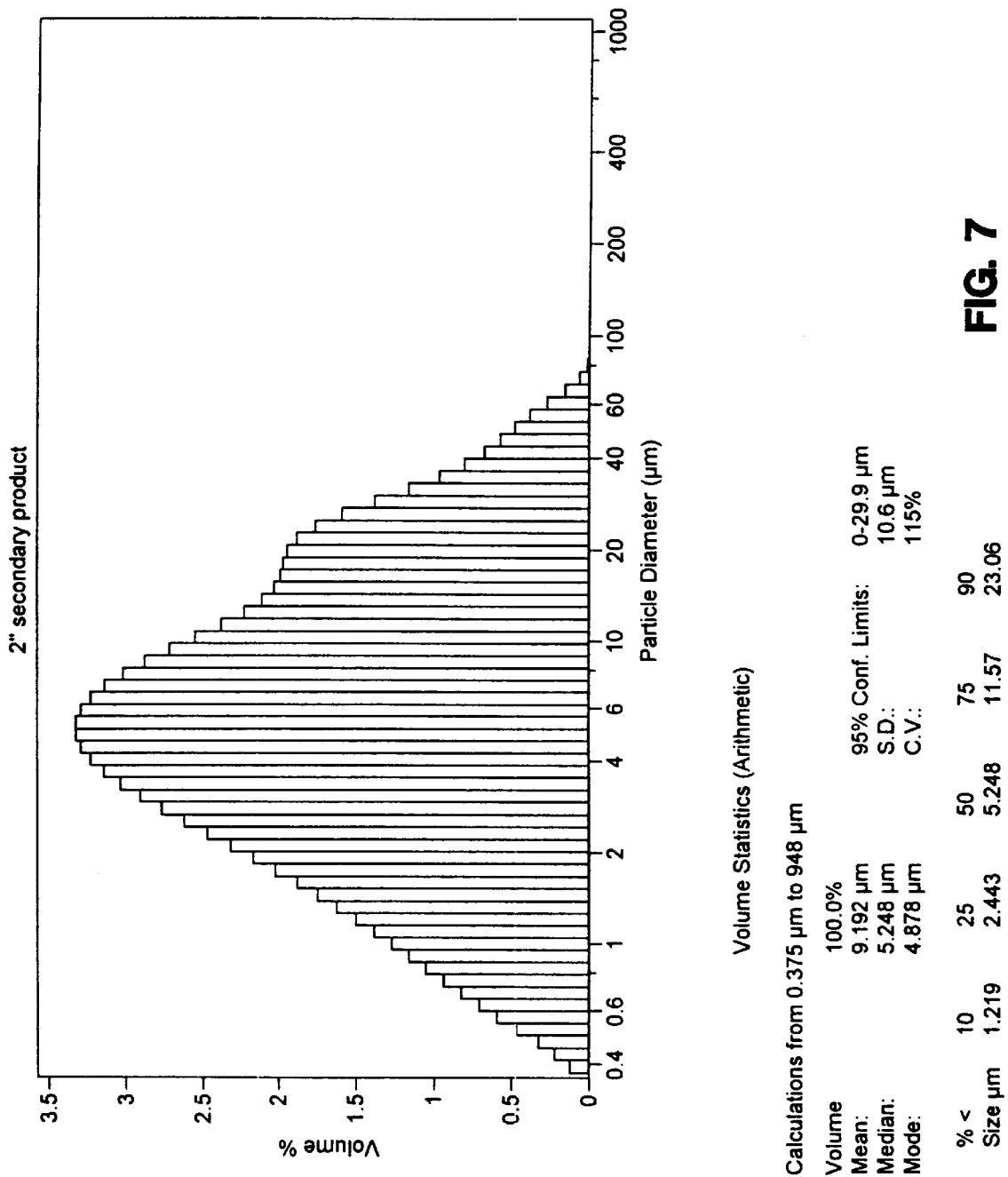
FIG. 7 is a graph showing particle size distribution for the clay and impurities after treatment in another (secondary two inch) hydrocyclone purification step of the purification process shown schematically in FIG. 1.

Underflow from the primary two inch hydrocyclone 110 flows by gravity through conduit 138 to a secondary two inch hydrocyclone feed tank 140 at a rate of about 10 gallons per minute. The underflow from the primary two inch hydrocyclone 110 (see FIG. 6 for particle size distribution) has a majority of impurity particles having a size between about 15 microns and about 200 microns, but contains a number of particles having a size less than about 10 microns, a portion of which are recovered in a secondary two inch hydrocyclone 142. This primary two inch hydrocyclone underflow, from primary two inch hydrocyclone 110, is fed to the secondary two inch hydrocyclone 142 though the secondary two inch hydrocyclone feed tank 140, conduits 144 and 146, pump 148 and conduit 150 to enter a side inlet of the secondary two inch hydrocyclone 142 at about 100 gallons per minute.

Figure 8:
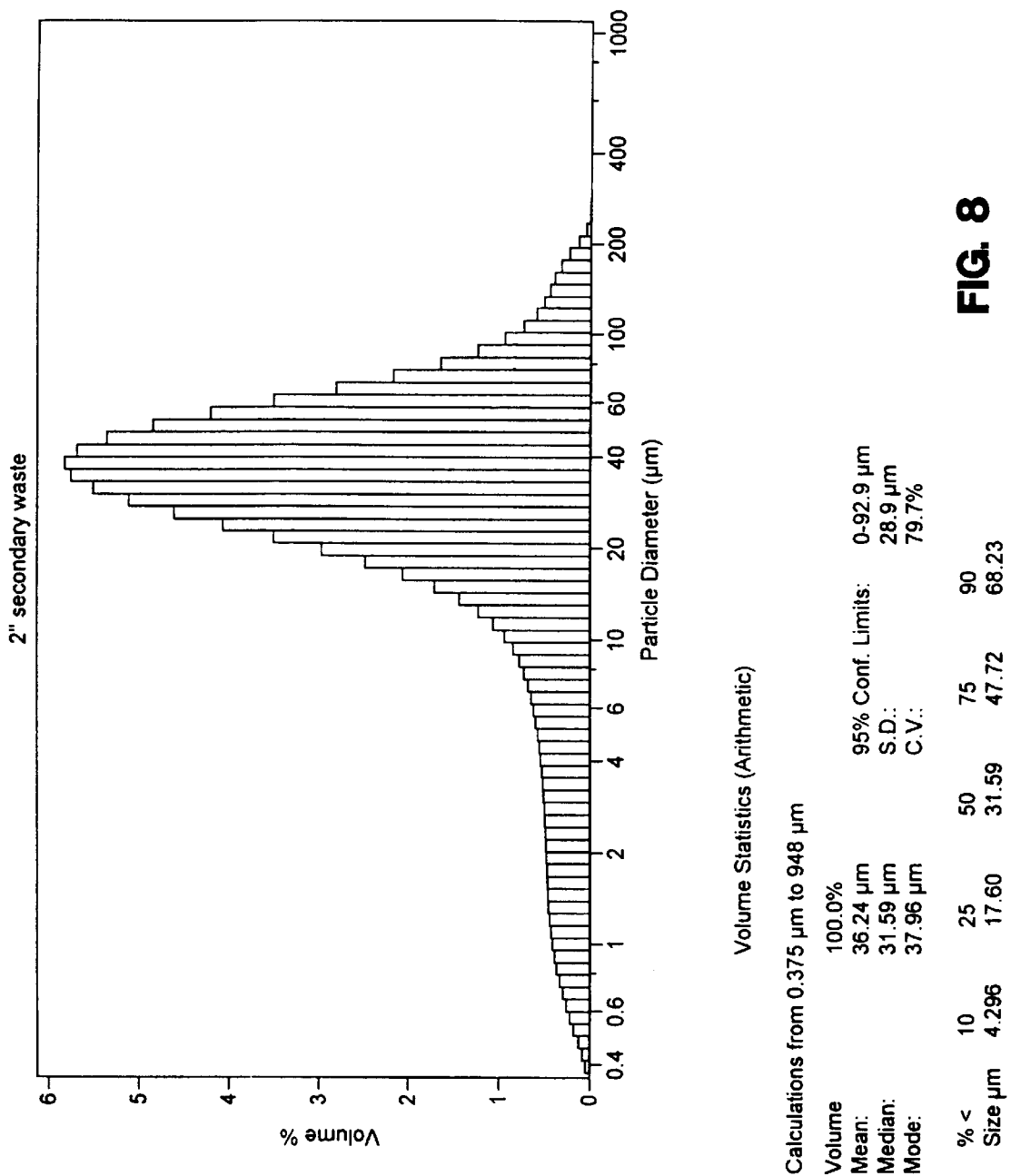
FIG. 8 is a graph showing particle size distribution for the clay and impurities removed from the product in the secondary two inch hydrocyclone purification step of the purification process shown schematically in FIG. 1.

Underflow from the secondary two inch hydrocyclone 142 flows through conduit 152 and is collected as waste. The particle size distribution of the secondary two inch hydrocyclone waste is shown in FIG. 8—most of the particles having a size less than about 10 microns are recovered in the secondary two inch hydrocyclone 142.

Overflow or product from the secondary two inch hydrocyclone is recirculated to the secondary two inch hydrocyclone feed tank 140 through conduits 154, 156 and 158 at a rate of about 50 gallons per minute to assure at least about two cycles of slurry through the secondary two inch hydrocyclone 142 before the slurry, as overflow from an upper portion of the two inch hydrocyclone feed tank 140, flows through conduit 159 to a secondary one inch hydrocyclone feed tank 160.

Figure 11:
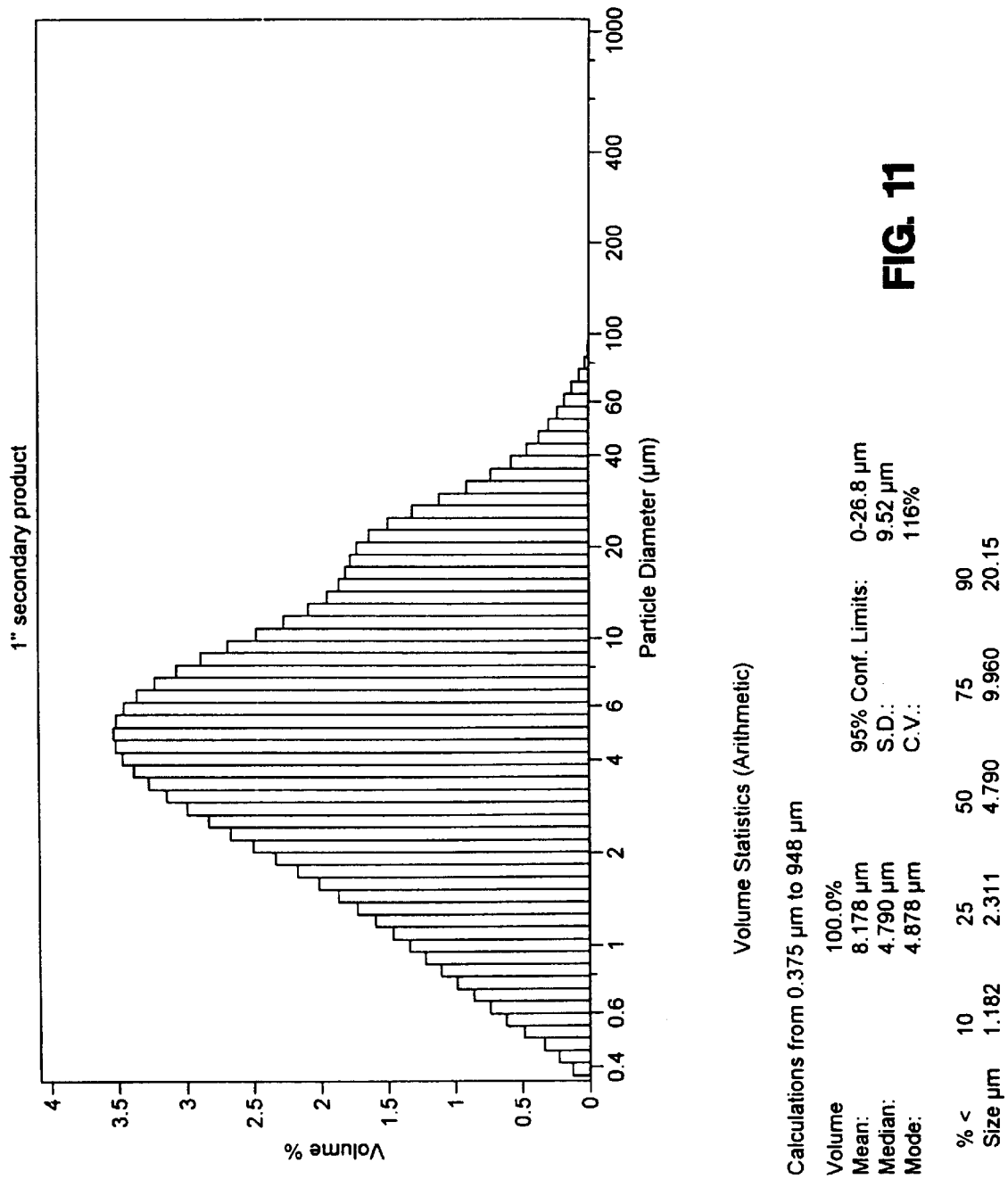
FIG. 11 is a graph showing particle size distribution for the clay and impurities after treatment in another (secondary one inch) hydrocyclone purification step of the purification process shown schematically in FIG. 1.
Figure 12:
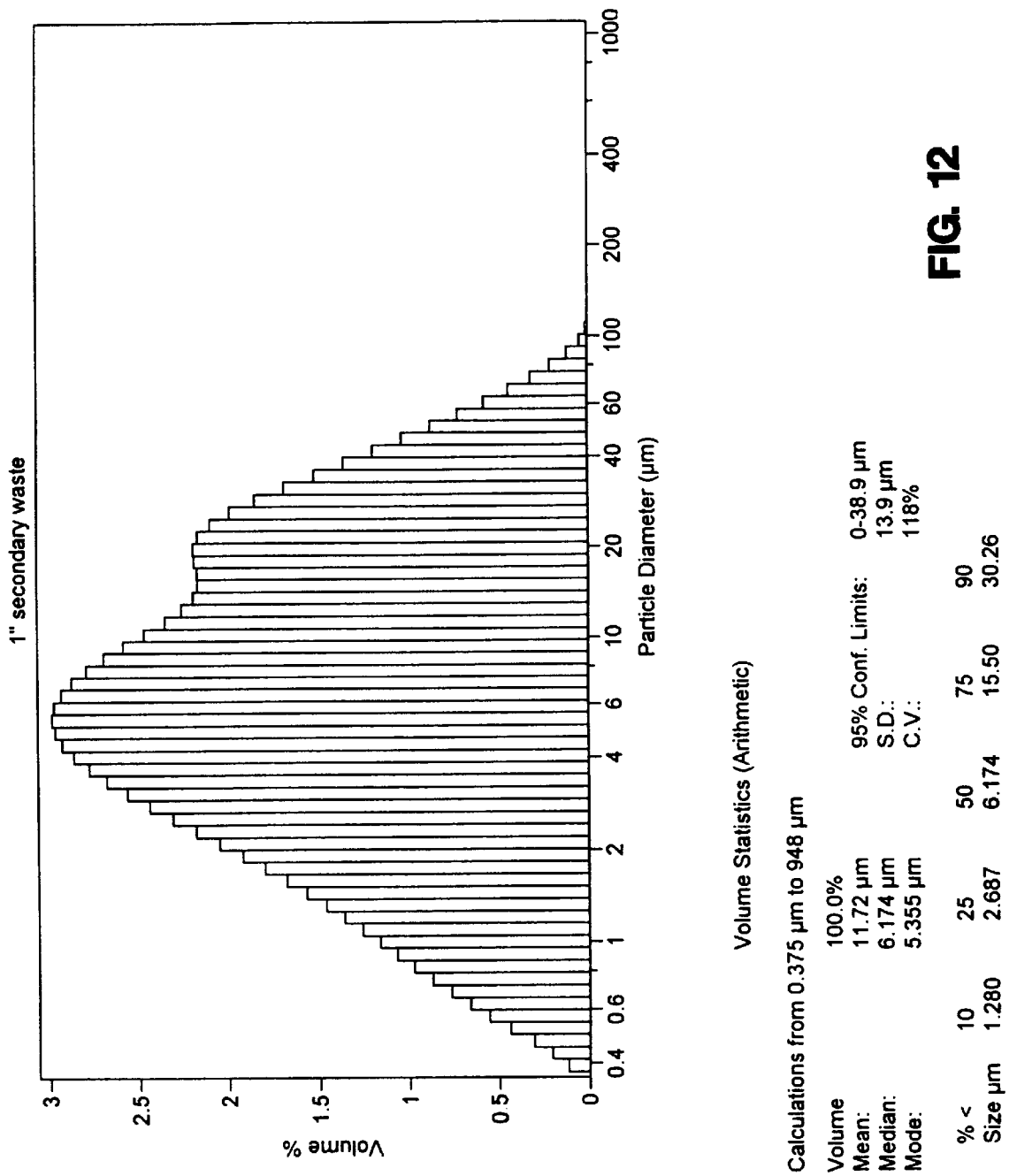
FIG. 12 is a graph showing particle size distribution for the clay and impurities removed from the product in the secondary one inch hydrocyclone purification step of the purification process shown schematically in FIG. 1.

The clay/impurities/water slurry fed to the secondary one inch hydrocyclone feed tank 160 flows through conduit 162, pump 164 and conduits 166 and 168 into a side inlet of a secondary one inch hydrocyclone 170 at a rate of about 50 gallons per minute. The slurry fed to the secondary one inch hydrocyclone 170 is recirculated through conduits 172, 174 and 176 back to the secondary one inch hydrocyclone feed tank 160 for about two cycles through the secondary one inch hydrocyclone 160 before product flows out of the secondary one inch hydrocyclone feed tank 160, through conduits 178 and 179 to an ion-exchange column feed tank 180. The overflow or product from the secondary one inch hydrocyclone feed tank 160 flows to the ion-exchange column feed tank 180 at about 15 gallons per minute. The particle size distribution of the product fed to the ion-exchange column feed tank 180 from secondary one inch hydrocyclone feed tank 160 is shown in FIG. 11.

Figure 5:
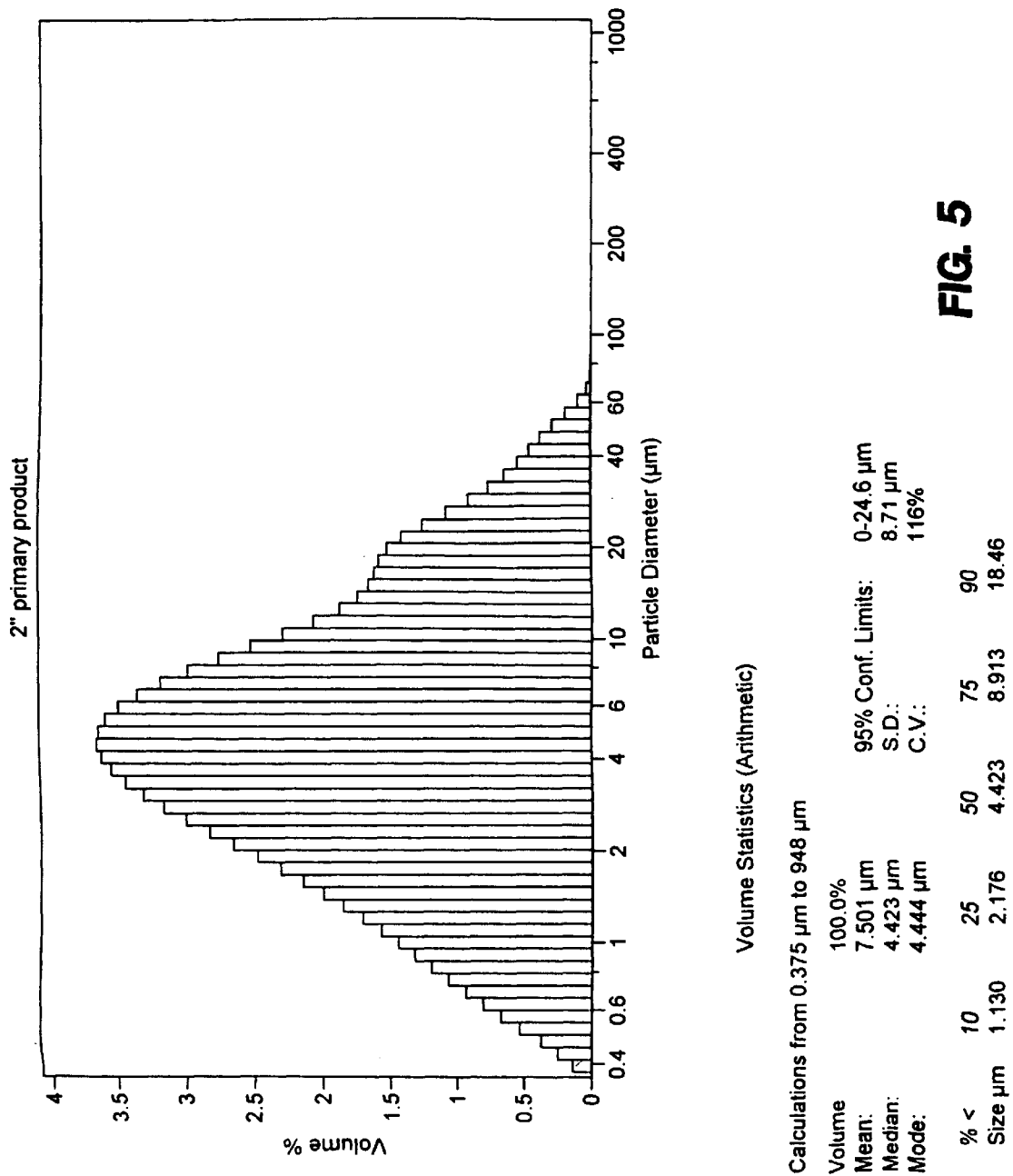
FIG. 5 is a graph showing particle size distribution for the clay and impurities product after treatment in another (primary two inch) hydrocyclone purification step of the purification process shown schematically in FIG. 1.

Referring now back to the primary one inch hydrocyclone feed tank 130 (which receives overflow or product from the primary two inch hydrocyclone—see particle size distribution of FIG. 5), the primary one inch hydrocyclone feed tank 130 receives slurry at a rate of about 30 gallons per minute and feeds a top of a primary one inch hydrocyclone 181 through conduits 182 and 184, pump 186, and conduits 188, 190 and 192 at a rate of about 60 gallons per minute. Product from the primary one inch hydrocyclone 181 exits a side of the one inch hydrocyclone 181 through conduits 194 and 196, and is recirculated to the primary one inch hydrocyclone feed tank 130 at a rate of about 60 gallons per minute, for at least two cycles through the primary one inch hydrocyclone 181.

Figure 9:
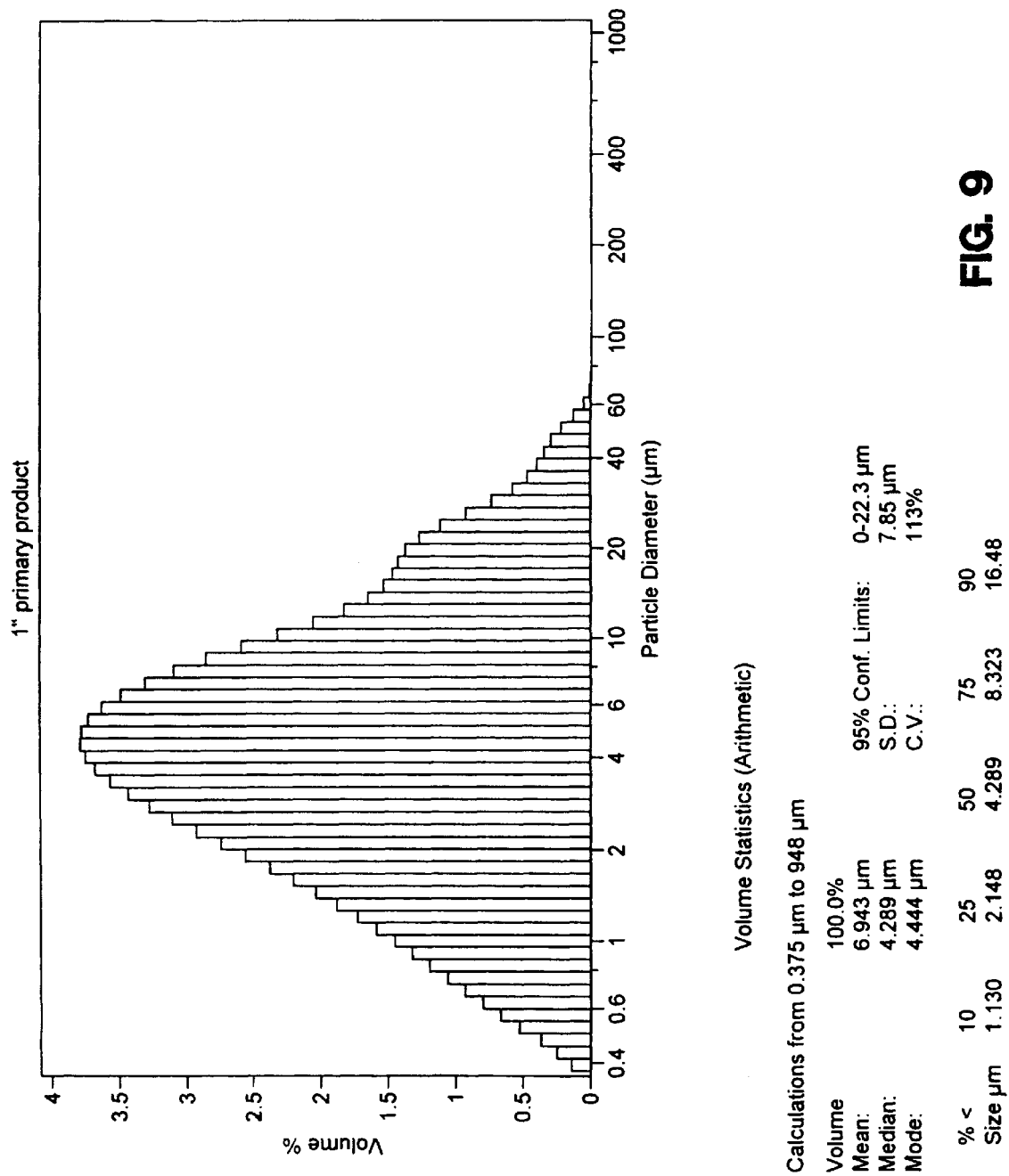
FIG. 9 is a graph showing particle size distribution for the clay and impurities after treatment in another (primary one inch) hydrocyclone purification step of the purification process shown schematically in FIG. 1.

Product from the primary one inch hydrocyclone 181 is removed from an upper portion of the primary one inch hydrocyclone feed tank 130 through conduit 198, where it joins product withdrawn from the secondary one inch hydrocyclone feed tank 160, in conduit 178, before being fed to the ion-exchange column feed tank 180, through conduit 179. Product from the primary one inch hydrocyclone 181, fed to the ion-exchange column feed tank 181, has a particle size as shown in FIG. 9, and includes at least about 90% by volume of particles having a size less than about 40 microns and having a mean particle size less than about 7 microns, and a median particle size less than about 5 microns.

Figure 10:
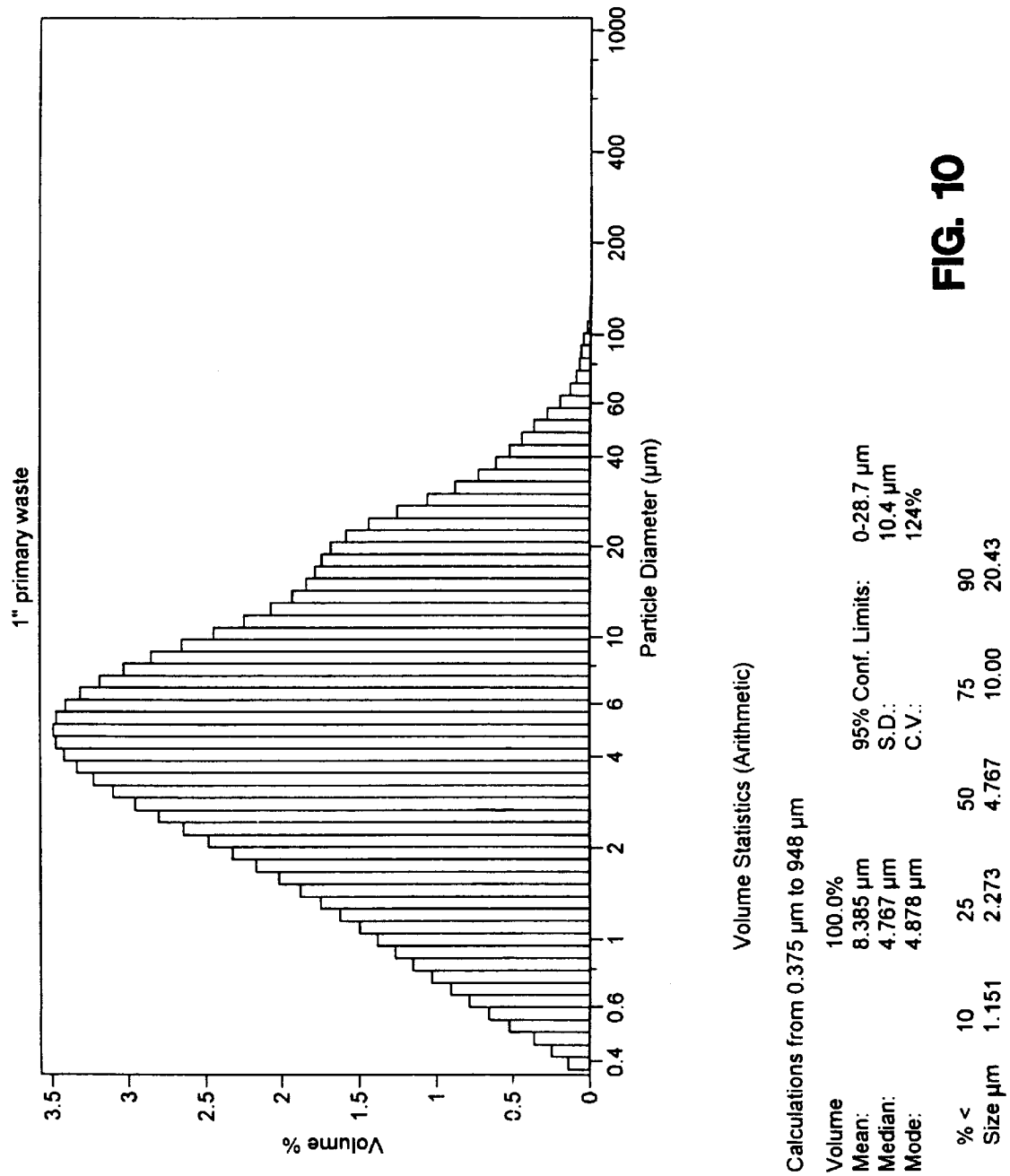
FIG. 10 is a graph showing particle size distribution for the clay and impurities removed from the product in the primary one inch hydrocyclone purification step of the purification process shown schematically in FIG. 1.

Underflow from the primary one inch hydrocyclone 181 is recirculated to the secondary one inch hydrocyclone feed tank 160 along conduits 200, 202, 204, 206 and 208. The particle size distribution of the underflow from the primary one inch hydrocyclone 181 is shown in FIG. 10. The product from the secondary one inch hydrocyclone 170 includes at least about 90% by volume particles having a size less than about 50 microns, a mean particle size less than about 10 microns, and a median particle size less than about 5 microns.

The product from the primary and secondary one inch hydrocyclones 181 and 170, respectively, are fed by gravity through conduit 179 to the ion-exchange feed tank 180 where the clay/water slurry, including impurities, are maintained at a clay concentration of about 1–7% by weight, preferably about 3–7% by weight, based on the total weight of material in the ion-exchange feed tank 180. The clay slurry from ion-exchange feed tank 180 is pumped through pump 210 to a series of ion-exchange columns 212, 214, 216, 218, 220 and 222 where any multivalent, e.g., divalent and/or trivalent interlayer cations are exchanged with monovalent cations, particularly sodium, by contact with an ion-exchange resin, preferably PUROLITE C-100, obtained from The PUROLITE Company, a polystyrene cross linked with divinyl benzene, in spherical bead form, in the sodium ionic form, having an 8% by weight divinyl benzene content.

In accordance with an important feature of the present invention, it has been found that for effective removal of the impurities that have a size less than about 10 microns in diameter, the clay should first be conditioned or treated for removal of all multivalent, e.g., divalent and trivalent, interlayer cations by substitution of the multivalent cations with one or more monovalent cations, such as sodium, in order to provide effective removal of the smallest impurities, for example, in a high speed (2,000–4,000 G) centrifuge. In accordance with another important feature of the present invention, it has been found that conveying the clay slurry through the hydrocyclones 86, 110, 142, 170 and 181 prior to sodium ion-exchange provides for a much more efficient process since the material fed to the hydrocyclones can be fed at a higher solids content without an undue increase in the viscosity of the material fed to the hydrocyclones. Accordingly, ion-exchange is accomplished after the clay slurry is passed through the hydrocyclones and before sending the partially purified clay slurry to a centrifuge for removal of the smallest impurities removed from the product.

Figure 13:
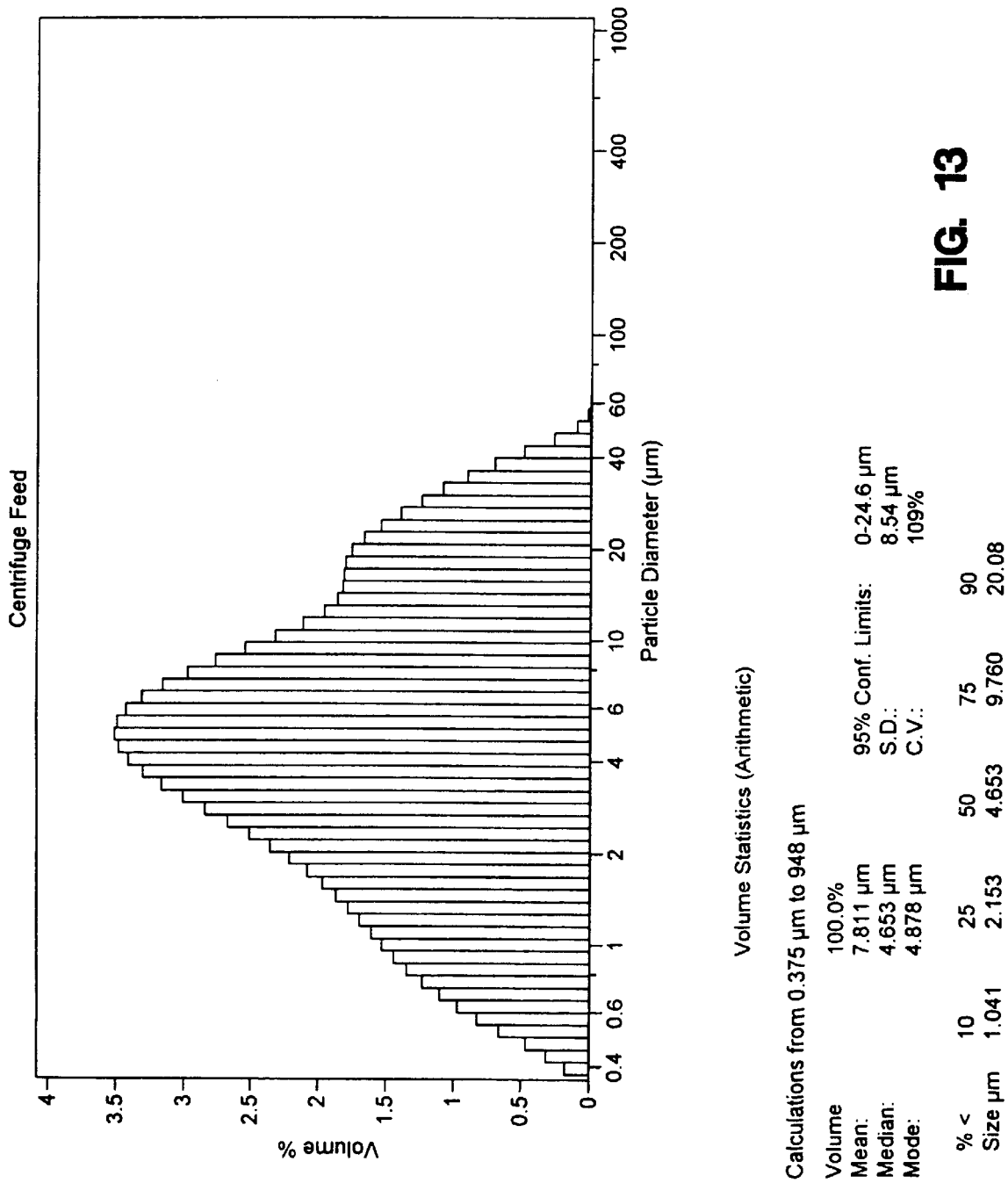
FIG. 13 is a graph showing particle size distribution for the clay and impurities being fed to a centrifuge in a centrifuge purification step of the purification process shown schematically in FIG. 1.
Figure 14:
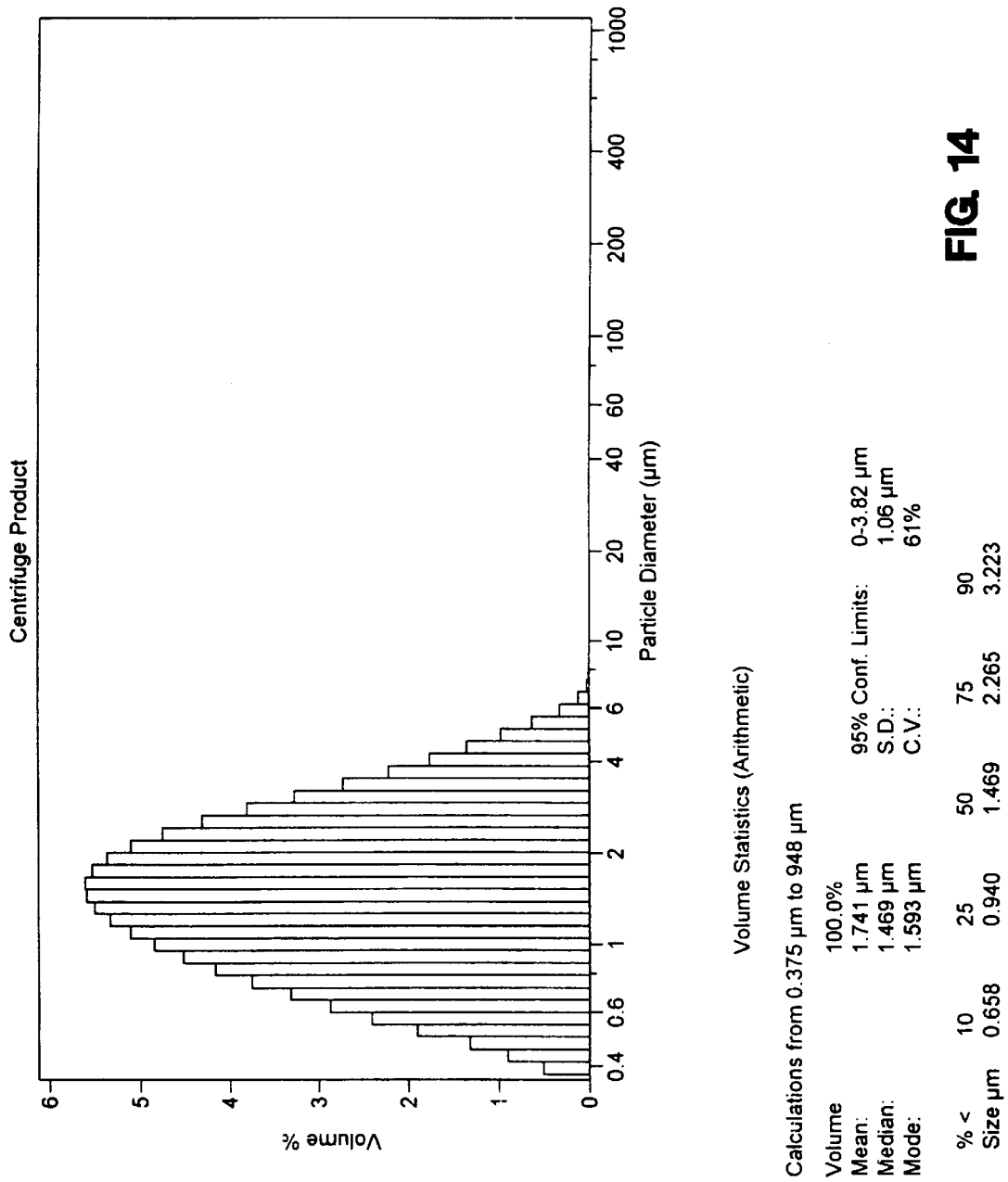
FIG. 14 is a graph showing particle size distribution for the final clay product (clay and impurities) after the centrifuge purification step of the purification process shown schematically in FIG. 1.
Figure 15:
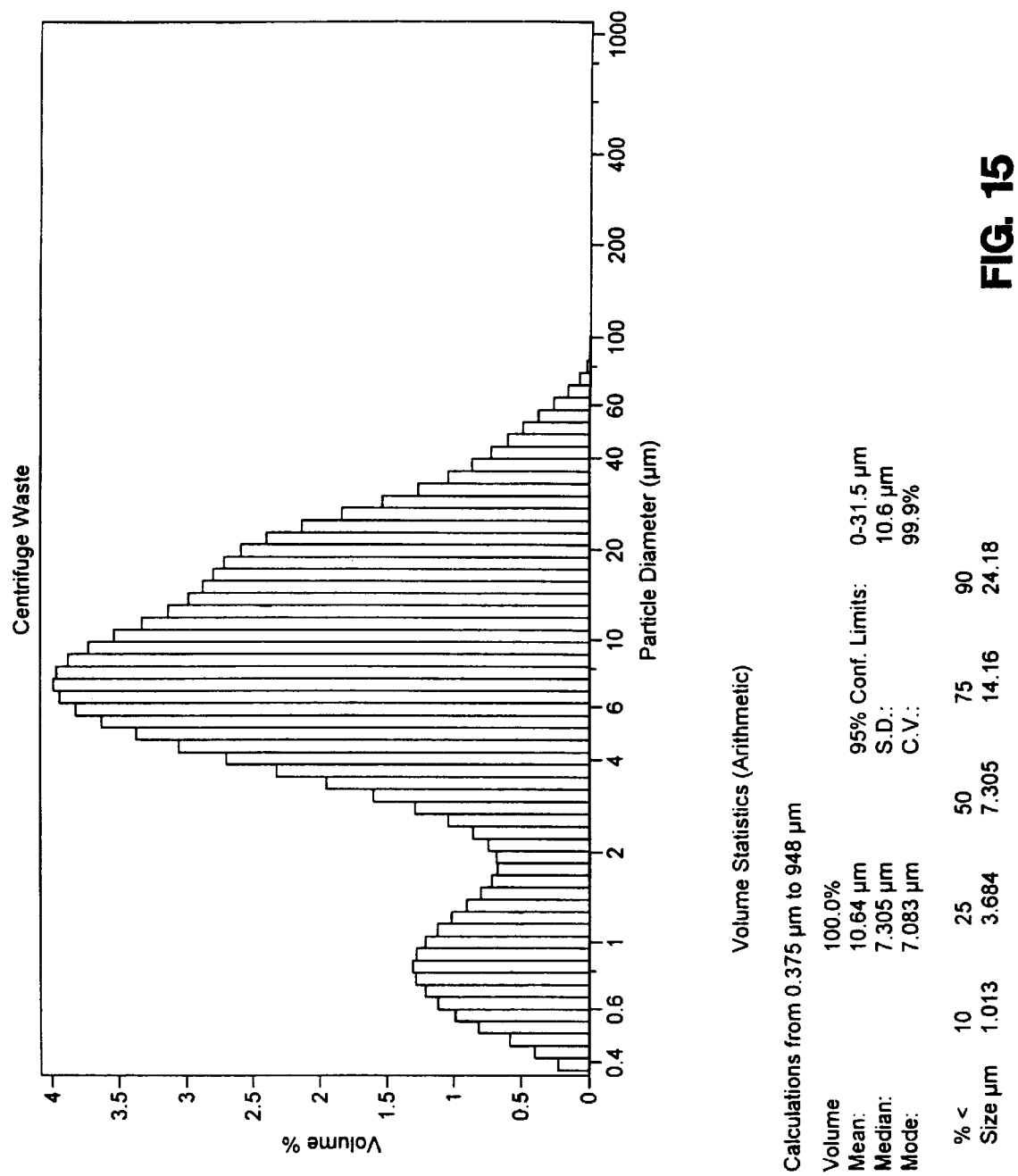
FIG. 15 is a graph showing particle size distribution for the clay and impurities removed from the product in the centrifuge purification step of the purification process shown schematically in FIG. 1.

From the ion-exchange columns 212, 214, 216, 218, 220 and 222, the clay slurry (FIG. 13) is fed through conduits 224, 226, 228 and 230 to a centrifuge feed tank 240 which feeds the material via pump 242 and conduits 244 and 246 to a high speed centrifuge 250 operating, in the preferred embodiment, at a centrifugal force of about 2,500 3,500 G (2,500–3,500 times the force of gravity). The product from the centrifuge (FIG. 14) is conveyed along conduits 252, 254 and 256 to a spray dryer feed tank 258 which feeds the clay slurry along conduits 260, 262 and 264 to a vibrating dewatering unit 266. The particle size distribution of the clay particles separated from the clay slurry in the centrifuge 250 is shown in FIG. 15. As shown in FIG. 15, the final product from the centrifuge 200 includes particles at least 90% of which have a size less than about 5 microns, the particles having a mean size less than about 2 microns, and a median size of about 1.5 microns. The vibrating dewatering unit 266 is essentially a vibrating filter, for constant removal of solids from the filtering medium, that is capable of reducing the solids content of the clay slurry down to about 10–15% solids, preferably about 12% solids.

The product from the vibrating dewatering unit 266 is conveyed along conduits 268 and 270 to a spray dryer 272. The constant shear provided in the vibrating dewatering unit 266 keeps the viscosity of the 12% clay solids slurry, which is thixotropic, sufficiently low so that the material can be conveyed along conduits 268 and 270 into the spray dryer 272, located close to the drying unit 266, so that viscosity does not become too high before entering the spray dryer 272. The spray dryer 272 dries the products down to about 5–15% moisture, based on the dry weight of the clay, preferably about 5–10% moisture, more preferably about 9% moisture (91% by weight solids) and the material is conveyed along conduit 274 to a spray dryer baghouse 276, where the solid product is recovered and separated from air. The product is recovered from conduits 278 and 280 and conveyed into product holding tanks 282, 284 and 286 where it may be further conveyed along conduits 288 and 290 to bagging apparatus 292 and 294.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A method of removing impurities from clay to form a purified clay product comprising:
   grinding the clay;
   slurrying the ground clay in water;
   removing a portion of the impurities from said slurried clay in the form of relatively large particles having a size larger than about 100 μm to form a partially purified clay,
   subjecting the partially purified clay to sufficient centrifugal force for separation of particles having a size larger than about 10 μm to form the purified clay product, and
   ion-exchanging the clay to substitute monovalent cations for at least 95% by weight of multivalent cations in the clay interlayer for further treatment to separate particles smaller than 10 μm.

2. A method in accordance with claim 1, wherein the purified clay product has a particle size distribution such that at least about 90% by volume of the particles have a size less than about 5 microns.

3. A method in accordance with claim 2, wherein the purified clay product has a particle size distribution such that at least about 95% by volume of the particles have a size less than about 5 microns.

4. A method in accordance with claim 3, wherein the purified clay product has a particle size distribution such that at least about 97% by volume of the particles have a size less than about 5 microns.

5. A method in accordance with claim 2, wherein the mean particle size of the purified clay product particles is less than 2 microns.

6. A method in accordance with claim 5, wherein the median particle size of the purified clay product particles is less than 2 microns.

7. A method in accordance with claim 5, wherein the mean particle size of the purified clay product particles is less than 1.8 microns.

8. A method in accordance with claim 6, wherein the median particle size of the purified clay product is less than 1.6 microns.

9. A method in accordance with claim 1, wherein the clay particles, after the hydrocyclone impurity removal step, include at least 90% of the particles having a particle size less than 60 microns in size.

10. A method in accordance with claim 9, wherein the clay particles, after the hydrocyclone impurity removal step, include at least 95% of the particles having a particle size less than 60 microns in size.

11. A method in accordance with claim 9, wherein after the hydrocyclone impurity removal step, the clay particles have a mean particle size less than about 10 microns, and a median particle size less than about 10 microns.

12. A method in accordance with claim 11, wherein after the hydrocyclone impurity removal step, the clay particles have a mean particle size less than about 8 microns, and a median particle size less than about 5 microns.

13. A method in accordance with claim 1, wherein the multivalent cations are substituted with a monovalent cation selected from the group consisting of sodium, hydrogen, and mixtures thereof.

14. A method in accordance with claim 1, wherein the slurry of clay and water is directed to the hydrocyclone from a feed tank, and hydrocyclone-treated clay product, having a portion of the larger impurity particles removed, is recycled to the feed tank and withdrawn from the feed tank for further hydrocyclone treatment, and wherein the slurry is fed to the hydrocyclone from the feed tank at a rate of about 2–5 times a rate of removal of hydrocyclone-treated clay product from the feed tank, for multiple passes through the hydrocyclone before removal of hydrocyclone-treated clay product for treatment in a smaller diameter hydrocyclone.

15. A method in accordance with claim 14, wherein the clay particles slurried in water that are directed to the hydrocyclone have a particle size distribution such that the particles have a size less than 400 microns in diameter.

16. A method in accordance with claim 15, wherein the clay particles slurried in water that are directed to the hydrocyclone have a particle size distribution such that the particles have a size less than 300 microns in diameter.

17. A method in accordance with claim 16, wherein the clay particles slurried in water that are directed to the hydrocyclone have a particle size distribution such that at least 95% by volume of the particles have a size less than 200 microns in diameter.

18. A method in accordance with claim 16, wherein at least 95% by volume of the particles treated in the hydrocyclone have a particle size less than 100 microns in diameter.

19. A method in accordance with claim 14, wherein the hydrocyclone-treated clay product is fed to a second feed tank for a second hydrocyclone of smaller diameter, for removal of additional relatively large impurity particles in the second hydrocyclone, and wherein product removed from the second hydrocyclone is recycled to the second hydrocyclone feed tank for multiple passes through the second hydrocyclone, the flow rate of hydrocyclone-treated product into the second hydrocyclone from the second feed tank being at a rate 2–5 times the rate of feed of hydrocyclone-treated product into the second feed tank.

20. A method in accordance with claim 19, wherein the second hydrocyclone produces a second hydrocyclone-treated clay product that is removed from the second hydrocyclone feed tank for further separation of relatively large impurity particles therefrom.

21. A method in accordance with claim 20, wherein the product from the second hydrocyclone has a particle size distribution such that at least 95% by volume of the particles have a size less than 40 microns in diameter.

22. A method in accordance with claim 20, wherein the second hydrocyclone-treated clay product removed from the second hydrocyclone feed tank is fed to a third hydrocyclone feed tank for a third hydrocyclone of smaller diameter than the second hydrocyclone, for removal of additional relatively large impurity particles therefrom, and wherein the flow rate of hydrocyclone-treated product into the third hydrocyclone from the third feed tank is at a rate 2–5 times the rate of feed of hydrocyclone-treated product into the third feed tank, and wherein the clay slurry product removed from the third hydrocyclone is recycled to the third hydrocyclone feed tank for multiple passes through the second hydrocyclone.

23. A method in accordance with claim 22, wherein the product from the third hydrocyclone has a particle size distribution such that at least 95% by volume of the particles have a particle size less than 30 microns in diameter.

24. A method in accordance with claim 20, wherein the larger impurity particles separated from the second hydrocyclone-treated clay product in the second hydrocyclone are fed to a secondary hydrocyclone feed tank for a secondary hydrocyclone having about the same size as, or smaller than, the diameter of said second hydrocyclone, for recovery of a smaller particle portion of the larger particles separated in the second hydrocyclone.

25. A method in accordance with claim 24, wherein the larger impurity particles separated from the second hydrocyclone-treated product in the third hydrocyclone are fed to another hydrocyclone having a diameter about the same size as, or smaller than, said third hydrocyclone for recovery of clay particles therefrom.

26. A method in accordance with claim 25, wherein the clay product from the third hydrocyclone, and the recovered clay from said another hydrocyclone are fed to an ion-exchange column, and including the step of ion-exchanging said clay product and recovered clay in the ion-exchange column to replace at least about 90% of any multivalent interlayer clay cations with monovalent cations.

27. A method in accordance with claim 1, further including the step of ion-exchanging the hydrocyclone-treated product in an ion-exchange column to replace at least about 90% of any multivalent interlayer clay cations with monovalent cations, prior to subjecting the clay to sufficient centrifugal force to remove particles larger than about 10 μm.

28. A method in accordance with claim 1, wherein the ion-exchange step is performed with an ion-exchange resin.

29. A method in accordance with claim 1, wherein the clay is a smectite clay.

30. A method of removing impurities from a layered clay comprising:
grinding the clay such that at least about 90% by weight of the clay has a particle size less than about 5,000 μm;
slurrying the ground clay in water;
passing the ground clay slurry through a hydrocyclone to remove a portion of the impurities in the form of relatively large particles, thereby removing all particles having a size larger than about 100 μm to form a hydrocyclone-treated product;
ion-exchanging said hydrocyclone-treated product to replace at least about 90% of clay multivalent interlayer cations with monovalent cations; and
subjecting the ion-exchanged clay to sufficient centrifugal force for separation of particles having a size larger than about 10 μm.

31. A method in accordance with claim 30, wherein the clay product has a particle size distribution such that at least about 90% by volume of the particles have a size less than about 5 microns.

32. A method in accordance with claim 31, wherein the clay product has a particle size distribution such that at least about 95% by volume of the particles have a size less than about 5 microns.

33. A method in accordance with claim 32, wherein the clay product has a particle size distribution such that at least about 97% by volume of the particles have a size less than about 5 microns.

34. A method in accordance with claim 31, wherein the mean particle size of the purified clay product particles is less than 2 microns.

35. A method in accordance with claim 34, wherein the median particle size of the purified clay product particles is less than 2 microns.

36. A method in accordance with claim 35, wherein the median particle size of the purified clay product is less than 1.6 microns.

37. A method in accordance with claim 34, wherein the mean particle size of the purified clay product particles is less than 1.8 microns.

38. A method in accordance with claim 30, wherein the clay particles, after the hydrocyclone impurity removal step, include at least 90% of the particles having a particle size less than 60 microns in size.

39. A method in accordance with claim 38, wherein the clay particles, after the hydrocyclone impurity removal step, include at least 95% of the particles having a particle size less than 60 microns in size.

40. A method in accordance with claim 38, wherein after the hydrocyclone impurity removal step, the clay particles have a mean particle size less than about 10 microns, and a median particle size less than about 10 microns in size.

41. A method in accordance with claim 40, wherein after the hydrocyclone impurity removal step, the clay particles have a mean particle size less than about 8 microns, and a median particle size less than about 5 microns in size.

42. A method in accordance with claim 30, wherein the clay is a smectite clay.

43. A method of purifying clay containing impurities comprising:
grinding of the clay to a particle size less than about 500 μm;
slurrying the clay and impurities in water;
sequentially treating the slurry containing clay and impurities by:
removing a portion of the particles in the slurry to provide a first partially purified clay; wherein at least about 95% by volume of particles are smaller than about 100 μm;
removing additional particles from the first partially purified clay to provide a second partially purified clay having at least about 95% by volume of the particles smaller than about 70 μm;
removing additional particles from the second partially purified clay to provide a third partially purified clay having at least about 95% by volume of the particles smaller than about 50 μm;

removing additional particles from the third partially purified clay to provide a fourth partially purified clay having at least about 95% by volume of the particles smaller than about 40 μm;

treating the fourth partially purified clay to remove at least about 95% of the clay interlayer multivalent cations and replacing said multivalent cations with monovalent cations to provide a monovalent, partially purified clay; and subjecting the monovalent partially purified clay to sufficient centrifugal force to separate particles therefrom having a size larger than 10 μm and such that at least about 95% by volume of the remaining particles have a size smaller than 6 μm, to form said purified clay.

44. A method in accordance with claim 43, wherein the clay is a smectite clay.

* * * * *